US007853046B2

(12) United States Patent
Sharony

(10) Patent No.: US 7,853,046 B2
(45) Date of Patent: Dec. 14, 2010

(54) IMAGING SYSTEM AND METHOD FOR BODY CONDITION EVALUATION

(75) Inventor: David Sharony, P.M. Israel (IL)

(73) Assignee: Vet-Tech Ltd., Katzrin (IL)

( * ) Notice: Subject to any disclaimer, the term of this patent is extended or adjusted under 35 U.S.C. 154(b) by 1186 days.

(21) Appl. No.: 10/523,204

(22) PCT Filed: Jul. 27, 2003

(86) PCT No.: PCT/IL03/00622

§ 371 (c)(1),
(2), (4) Date: Jan. 18, 2006

(87) PCT Pub. No.: WO2004/012146

PCT Pub. Date: Feb. 5, 2004

(65) Prior Publication Data

US 2006/0126903 A1   Jun. 15, 2006

(30) Foreign Application Priority Data

Jul. 25, 2002   (IL) .................................... 150915

(51) Int. Cl.
*G06K 9/00* (2006.01)
*A22C 25/00* (2006.01)
*G01B 11/30* (2006.01)

(52) U.S. Cl. .................. 382/110; 356/603; 452/157

(58) Field of Classification Search ................ 382/110, 382/162, 165, 199, 201, 203; 356/396, 445, 356/603; 348/135; 700/90; 702/179
See application file for complete search history.

(56) References Cited

U.S. PATENT DOCUMENTS

| | | | |
|---|---|---|---|
| 5,398,290 A | | 3/1995 | Brethour |
| 5,412,420 A * | | 5/1995 | Ellis ........................... 348/135 |
| 5,483,441 A * | | 1/1996 | Scofield ....................... 700/90 |
| 5,576,949 A | | 11/1996 | Scofield et al. |
| 6,234,109 B1 | | 5/2001 | Andersson et al. |
| 6,377,353 B1 | | 4/2002 | Ellis |
| 6,549,289 B1 * | | 4/2003 | Ellis ........................... 356/603 |
| 6,974,373 B2 * | | 12/2005 | Kriesel ....................... 452/157 |
| 7,039,220 B2 * | | 5/2006 | Kriesel ....................... 382/110 |

OTHER PUBLICATIONS

Coffey, M. P., T. B. Motram, and N. McFarlance. 2003. A feasibility study on the automatic recording of condition score in dairy cows. p. 131 in Proc. Annu. Meet. Br. Assoc. Anim. Sci. Mar. 2003 York. British Assoc. Anim. Sci. BSAS, Penicuik, Midlothian, UK.*

* cited by examiner

*Primary Examiner*—Vu Le
*Assistant Examiner*—Andrae S Allison
(74) *Attorney, Agent, or Firm*—Browdy and Neimark, PLLC

(57) ABSTRACT

An imaging method and system are presented for use in automatic monitoring the body condition of an animal A predetermined region of interest on the animal body is imaged, and data indicative of the acquired one or more images is processed to obtain a three-dimensional representation of the region of interest. The three-dimensional representation is analyzed to determine a predetermined measurable parameter indicative of a surface relief of the region of interest which is indicative of the body condition of the imaged animal. The technique of the present invention is useful for determining the energy balance condition of the animal (e.g., dairy cow) or the tendency in the energy balance change, to thereby enable appropriately adjusting nutrition of the specific animal; as well as for determining the existence of in coordination and/or locomotion in the animal's natural marching.

29 Claims, 6 Drawing Sheets

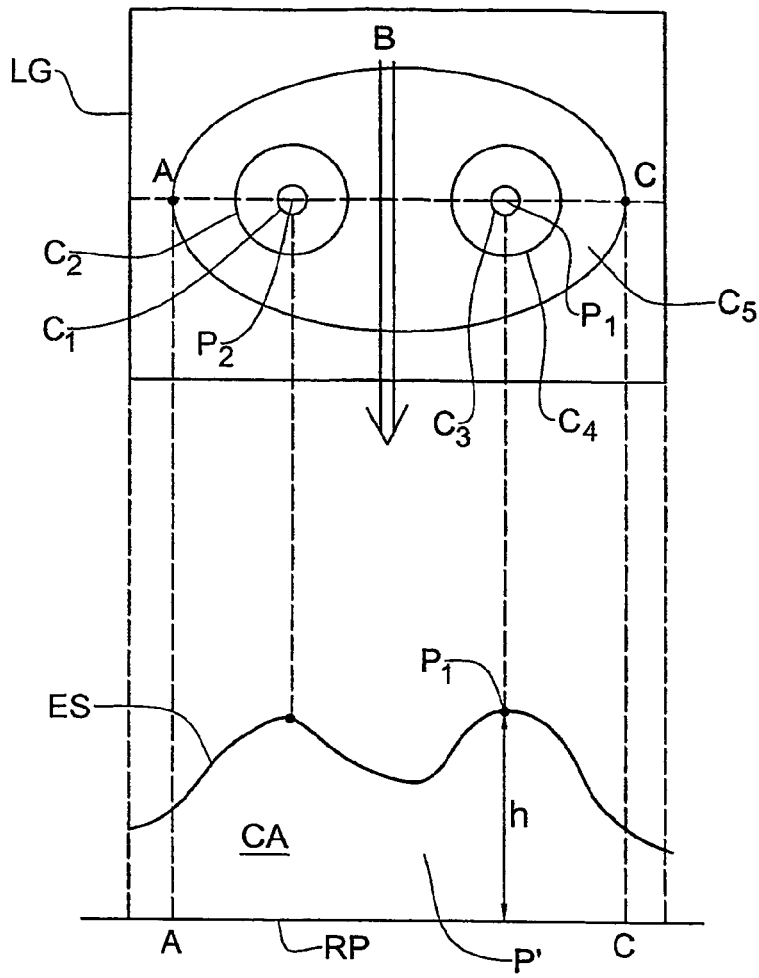
FIG. 5C
FIG. 5B
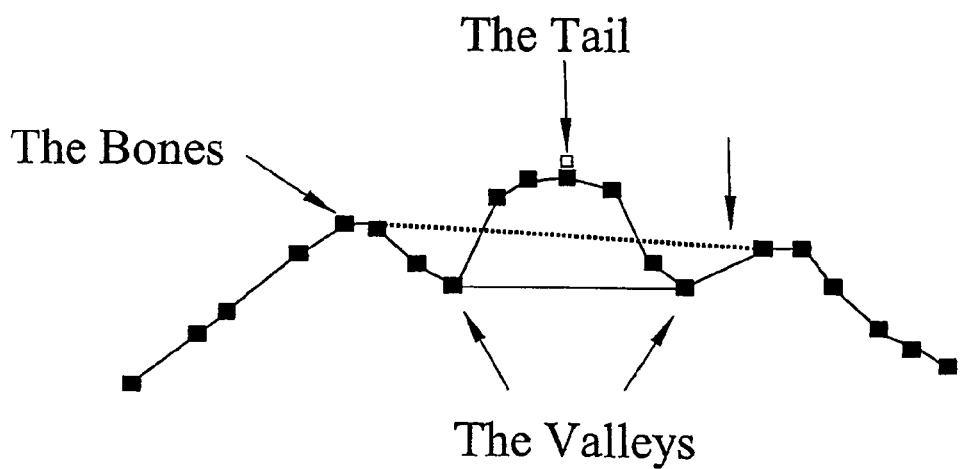
FIG. 5D

IMAGING SYSTEM AND METHOD FOR BODY CONDITION EVALUATION

FIELD OF THE INVENTION

The invention is generally in the field of monitoring techniques, and relates to a monitoring method and system for body condition evaluation, particularly useful for estimating the body condition score of animals, such as dairy cows.

BACKGROUND OF THE INVENTION

Measuring a variety of attributes of animals, such as cows or beef cattle, is of high importance for farmers. Techniques aimed at determining animal traits, such as the identification of a specific animal, recognizing and determining the position of an animal or a specific part of it, or physical characteristics of an animal defining its economic value, have been developed, and are disclosed, for example, in the following patents.

U.S. Pat. No. 5,412,420 discloses a technique for measuring three-dimensional (3D) phenotypic characteristics of dairy cows. A 3D image is created by projecting several laser light beams and measuring their reflections with a single laser camera that scans a surface area of the animal and measures the distance at each point between the camera and the surface of the animal. By this, a total modeling of the animal's surface is provided. The camera generates a detailed map of the entire animal within the scanned space, assigning intensity and range values to each surface point that receives a laser signal. The obtained image is then analyzed by linear, angular or volumetric means. There are currently 15 conformation traits that are measured for Holstein Cows. After each trait is measured by the system, it is then converted to a scale of 1 to 50. Known as the rating of each trait, this conversion to a scale of 1 to 50 compares each cow measured to those represented within the biological extremes of the breed.

U.S. Pat. No. 6,234,109 discloses an apparatus and method for recognizing and determining the position of a specific part of an animal, e.g., the teat of a dairy cow, to guide an animal-related device towards the determined position of said part. The apparatus comprises a source of structured light for illuminating a surface region to enable identification of this specific part. The source of structured light is obtained by using a grid associated with a light-emitting element. The apparatus also comprises an image capture and processor means arranged to capture and process at least one image formed by said light, and control means to determine if the illuminated object includes said specific part by comparing the image of the illuminated object to reference criteria defining different objects, and if so, to establish the position thereof of the illuminated object.

U.S. Pat. Nos. 5,483,441 and 5,576,949 disclose a system for animal evaluation through image acquisition. According to this technique, an animal is evaluated to determine characteristics or traits thereof. The animal is evaluated as it moves through first and second scenes that correspond to different first and second fields of view along two essentially perpendicular lines of sight. Evaluation is carried out by comparing the so-obtained gray level to certain threshold values.

U.S. Pat. No. 5,398,290 discloses a system for measuring intramuscular fat in live cattle by an ultrasound device to produce ultrasound image of an interior muscle portion. The image contains speckles caused by the scattering of ultrasound waves by the intramuscular fat. Image data representative of the speckles are analyzed in a computer in terms of pixel gray areas to produce a measure of intramuscular fat.

The monitoring of body condition score (BCS) of dairy cows is a very important aid in defining their herd management. The BCS is known as a herd technique for determining the energy balance of dairy cows to define inter alia the amount of food needed for a particular group of dairy cows. According to this technique, an area on the cow's body in the vicinity of the tail head is inspected. This technique consists of the visual inspection of the vicinity of the tail head carried out by a skilled person, who determines the dairy cow's condition and assigns to the specific cow a corresponding mark from several accepted marks. The results of such a manual inspection strongly depend on the experience of the specialist carrying out the inspection.

SUMMARY OF THE INVENTION

There is accordingly a need in the art to facilitate the automatic monitoring of the body condition, by providing a novel imaging method and system.

The main idea of the present invention consists of imaging a region of interest on the body to obtain a three-dimensional representation of the region of interest, and analyzing the three-dimensional representation to determine data indicative of the curvature (surface relief) of this region and utilize certain reference data to determine the body condition. This can be implemented by determining, from the 3D representation of the region of interest, a predetermined measurable parameter indicative of the curvature of the region of interest. Then, previously prepared reference data representative of the body condition scales and corresponding values of the predetermined measurable parameter can be used to analyze the determined value of this parameter for the specific imaged body and estimate the corresponding value of the body condition scale.

The term "curvature" signifies data indicative of a topographic map (surface relief) of the region of interest, and is actually representative of the surface defined by the volume (depth) of the region of interest. Preferably, the curvature is determined with respect to a predefined plane (reference plane) tangential to the region of interest. Considering monitoring the body condition score (BCS) of dairy cows, the region of interest includes the dorsal and/or the rear part of the cow in the vicinity of its tail head, and the reference plane is preferably tangential to the dorsal and/or the rear part of the cow at the point of both pins bones and tail.

The technique of the present invention is useful for estimating the current and the tendency of the energy balance of an animal (to thereby enable appropriately adjusting nutrition of the specific animal) and for determining irregularity in the locomotion and coordination patterns of an animal (which is indicative of a disease), as well as for modeling a body part (human or animal body).

There is thus provided according to one aspect of the present invention, an imaging method for use in automatic monitoring the body condition of an animal, the method comprising:

(i) imaging a predetermined region of interest on the animal body, and generating data indicative thereof;

(ii) processing the generated data to obtain a three-dimensional representation of the region of interest;

(iii) analyzing said three-dimensional representation to determine a predetermined measurable parameter indicative of a surface relief of the region of interest indicative of the body condition of the imaged animal.

According to another aspect of the invention, there is provided a method for optimizing nutrition of an animal, the method comprising automatically monitoring the energy balance of the animal, said monitoring comprising:

i) imaging a predetermined region of interest on the animal body, and generating data indicative thereof;

ii) processing the generated data to obtain a three-dimensional representation of the region of interest;

iii) analyzing said three-dimensional representation to determine a predetermined measurable parameter indicative of a surface relief of the region of interest indicative of the energy condition of the animal.

The imaging includes acquiring one or more image of the region of interest by illuminating the region of interest with structured light (i.e., one- or two-dimensional array of spatially separated light components) and collecting light scattered from the illuminated regions. The image is then processed to calculate the predetermined measurable parameter indicative of the curvature (surface relief) of the region of interest, and utilize certain reference data to determine a value of body condition corresponding to the calculated value of the predetermined parameter. The reference data is previously prepared by applying measurements with both the conventional and inventive technique to animals, and is representative of the body condition scales (values) and corresponding values of the predetermined measurable parameter.

The image acquisition may be carried out by one or two pixel-array detectors. Preferably, a video camera is used for sequentially acquiring a plurality of images. Preferably, the images are acquired during a relative displacement between the animal and camera, e.g., the animal moves along a pre-defined path.

The measurable parameter indicative of the curvature of the region of interest may be at least one of the following: a distance (height) of the extreme point in the topographic map (determined as a distance between the reference plane and a point in the region of interest mostly distant from the reference plane); the area of a cross-section of the topographic map in a plane perpendicular to the reference plane (surface area defined by the illuminated surface regions in the plane perpendicular to the reference plane) and including the extreme point in the map; and at least a part of the volume (depth) defined by at least a predetermined region of the topographic map (illuminated surface regions) with respect to the reference plane.

According to another aspect of the present invention, there is provided an imaging method for use in automatic monitoring the body condition score (BCS) of a dairy cow, the method comprising:

(i) imaging a region of interest including at least one of the dorsal part or the rear part of the cow in the vicinity of its tail head, and generating data indicative thereof;

(ii) processing the generated data to obtain a three-dimensional representation of the region of interest;

(iii) analyzing said three-dimensional representation to determine a predetermined measurable parameter indicative of a surface relief of the region of interest indicative of the BCS of the imaged cow.

According to yet another aspect of the present invention, there is provided a method for monitoring the body condition of an animal, the method comprising:

providing reference data representative of the body condition scales and corresponding values of a predetermined measurable parameter indicative of the curvature of a region of interest on the body;

imaging the region of interest by illuminating an array of spaced-apart locations on the body within the region of interest, collecting light returned from the illuminated locations, and generating data indicative thereof;

processing said generated data to obtain a three-dimensional representation of the region of interest and calculate a value of the predetermined measurable parameter from said three-dimensional representation; and utilizing said reference data to determine the body condition scale corresponding to the calculated value of said predetermined measurable parameter.

According to yet another aspect of the present invention, there is provided a method for monitoring the body condition score (BCS) of a dairy cow, the method comprising:

providing reference data representative of the BCS scales and corresponding values of a predetermined measurable parameter indicative of the curvature of a region of interest including at least one of the dorsal part and the rear part of the cow in the vicinity of its tail head;

imaging the region of interest by illuminating an array of spaced-apart locations on the cow body within the region of interest, collecting light returned from the illuminated regions, and generating data indicative thereof;

processing said generated data to obtain a three-dimensional representation of the. region of interest and calculate a value of the predetermined measurable parameter from said three-dimensional representation; and utilizing said reference data to determine the BCS scale corresponding to the calculated value of said predetermined measurable parameter.

The processing of the data indicative of the acquired image includes determining a shift of the location of each of the illuminated locations on the surface of the body caused by the curvature of the surface. If a single image is acquired, such a shift is a distance between the actual position of the illuminated location on the curved surface and corresponding location along the trajectory of the corresponding light component (i.e., a theoretical location of the corresponding location on the surface, if the surface were substantially flat). If two images are acquired with different angles of collection of light returned from the region of interest, the shift is a distance between positions of the two illuminated locations of a matching pair of locations in the two images (Paralax). To this end, the processing preferably includes determining the central points of all the illuminated locations. The shift is indicative of the height of the respective point in the map (3D representation), and is determined utilizing data indicative of the detectors' location with respect to each other and relative to the region of interest, or the single detector's location relative to the region of interest and to the trajectories of the incident light components.

According to yet another aspect of the invention, there is provided a method for monitoring the condition of an animal, the method comprising:

imaging the cow while marching along a predetermined path and generating data indicative of the acquired images;

analyzing said data to identify the existence of a certain pattern of locomotion or in-coordination in the cow's marching.

The technique of the present invention can thus be used to determine the existence of in coordination, locomotion and some neurological disorders associated with nervous system diseases, such as: the "mad cow" disease, CCN (Cerebrocortical necrosis), tumors, parasitoses, meningitis, rabies, trauma, compression and intoxicoses of the animal.

According to yet another aspect of the invention, there is provided an imaging method for use in automatic monitoring the body condition score (BCS) of a dairy cow, the method comprising:

imaging a first region of interest on the cow's body in the vicinity of the waist part of the cow and a second region of interest on the cow's body in the vicinity of its tail part, and generating imaged data;

processing the imaged data to obtain a three-dimensional representation of the first region of interest and the second region of interest;

analyzing the three-dimensional representation to determine a predetermined measurable parameter indicative of a surface relief of the region of interest, thereby determining first and second BCS values for the first and second regions of interest, respectively, a difference between the first and second BCS values being indicative of a tendency in the cow energy balance condition.

The waist part of the cow's body is of interest because it is indicative of the transverse processes of the lumbar vertebrae and the spinous processes of the lumbar vertebrae. For example, the BCS values of 3.2 and 3.1 measured at, respectively, the first region of interest (transverse processes of the lumbar vertebrae and the spinous processes of the lumbar vertebrae) and the second region of interest (the tail-part of the cow) are indicative of that the cow is in accumulating surplus of the energy balance, and vice versa, if the BCS values of 3.1 and 3.2 are measured at, respectively, the first and second regions of interest, this is indicative of that the cow is in accumulating deficit of the energy balance.

According to yet another aspect of the present invention, there is provided a system for monitoring the body condition of an animal, the system comprising:

(a) an optical device including an illuminating assembly operable to produce structured light in the form of an array of spatially separated light components to thereby illuminate an array of locations within a predetermined region of interest on the body part, and a light detection assembly operable for acquiring at least one image of the illuminated body part by collecting light scattered therefrom and generating data indicative of the acquired image;

(b) a control unit connectable to the optical device, the control unit comprising a memory for storing reference data representative of the body condition scales and corresponding values of a predetermined measurable parameter that is indicative of the surface relief of the predetermined region of interest of the body part; and a data processing and analyzing utility preprogrammed for processing the data indicative of the acquired image to obtain a three-dimensional representation of the imaged region, calculate a value of the measurable parameter for the imaged body part, and analyze the calculated value with respect to the reference data to thereby determine the body condition scale of the specific animal.

According to yet another aspect of the present invention, there is provided a system for monitoring the body condition score (BCS) of a dairy cow, the system comprising:

(a) an optical device including an illuminating assembly operable to produce structured light in the form of an array of spatially separated light components to thereby illuminate an array of locations within a predetermined region of interest on a body part of the dairy cow, and a light detection assembly operable for acquiring at least one image of the illuminated body part by collecting light scattered therefrom and generating data indicative of the acquired image;

(b) a control unit connectable to the optical device, the control unit comprising a memory for storing reference data representative of the BCS scales and corresponding values of a predetermined measurable parameter that is indicative of the surface relief of the predetermined region of interest including at least one of the following body parts: the rear part of the cow in the vicinity of its tail head and at least one dorsal part of the cow; and a data processing and analyzing utility preprogrammed for processing the data indicative of the acquired image to obtain a three-dimensional representation of the region of interest and calculate a value of the measurable parameter for the specific imaged cow, and analyze the calculated value with respect to the reference data to thereby determine the BCS scale of the specific dairy cow.

The illuminating assembly may have one of the following configuration: It may be composed of a single light emitting element and a mask formed with an array of spaced-apart light transmitting regions spaced by light blocking regions; may be formed by an array of spaced-apart light emitting elements (lasers); may be a scanner, namely a light source (e.g. laser) that moves rapidly and scans the area; may be composed of one or more linear light sources or line scan; or may include a diffraction mask that creates a pattern.

More specifically, the present invention is used for determining the BCS of dairy cows aimed at optimizing the cows' nutrition and is therefore described below with respect to this specific application.

BRIEF DESCRIPTION OF THE DRAWINGS

In order to understand the invention and to see how it may be carried out in practice, preferred embodiments will now be described, by way of non-limiting example only, with reference to the accompanying drawings, in which:

FIGS. 5A-5C exemplify the principles of calculation of a specific measurable parameter indicative of the curvature of the region of interest;

FIG. 5D schematically illustrates the spots' pattern on the dorsal and/or the rear part of a cow.

DETAILED DESCRIPTION OF THE INVENTION

Figure 1:
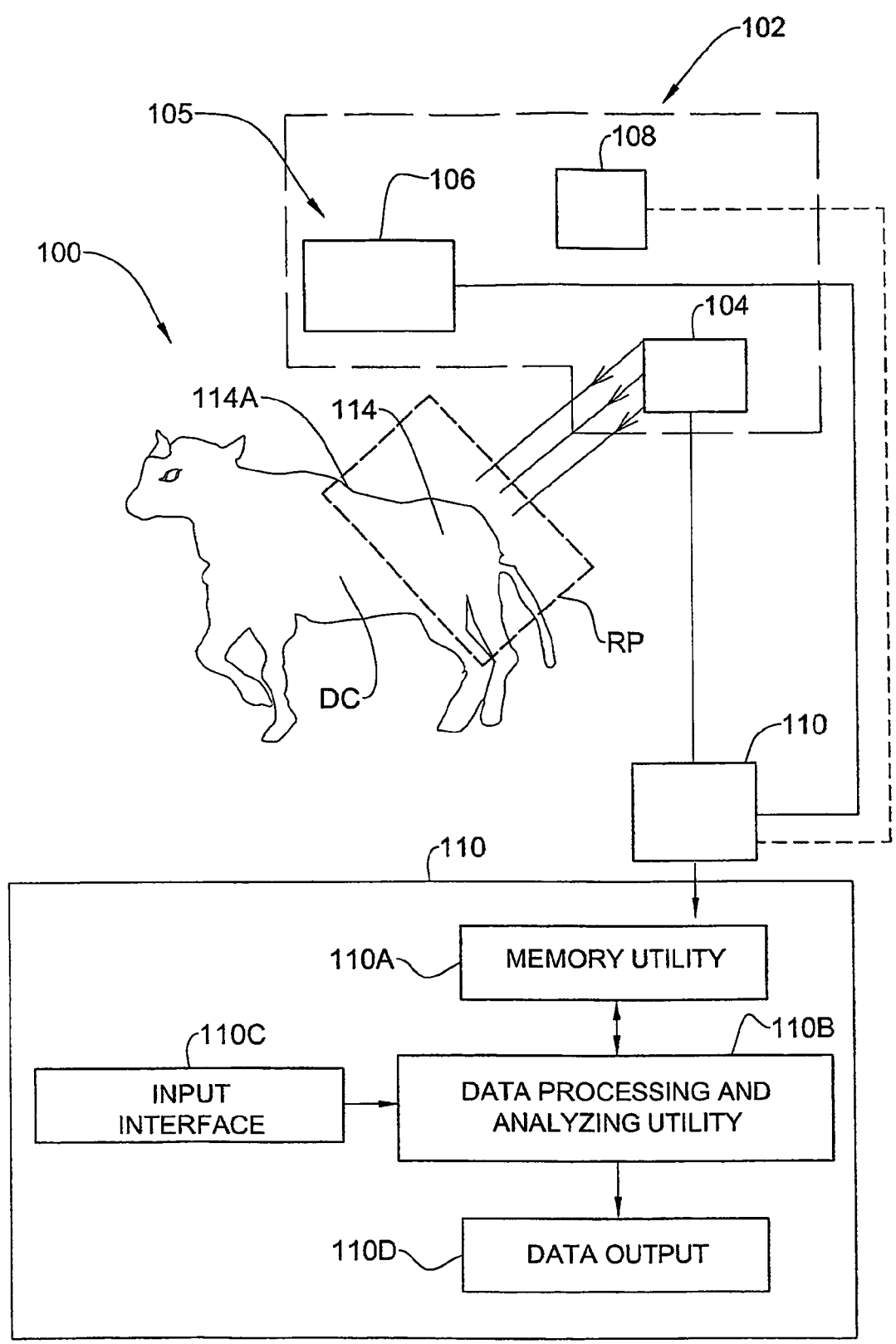
FIG. 1 is a schematic illustration of the main components of the imaging system according to the present invention.

Referring to FIG. 1, there is schematically illustrated an imaging system 100 according to the invention for determining the BCS of a dairy cow DC. The cow is typically provided with an identification code carrying tag (not shown) attached, for example, to its leg (e.g., front leg), neck, ear or any other place. The imaging system 100 includes an optical device 102 and a control unit 110.

The optical device 102 includes an illuminating assembly 104 and a detection assembly 105. The detection assembly 105 includes a pixel-array detector 106, which is preferably a video camera, and may optionally include an additional pixel-array detector 108 (shown in dashed lines). The illuminating assembly 104 is constructed and operated to produce structured light in the form of an array (one- or two-dimensional array) of light components, as will be described more specifically further below with reference to FIGS. 2A-2C. The camera(s) 106 is accommodated and oriented with respect to the body (a site where the body is to be located during the monitoring procedure) so as to acquire images of a predetermined region of interest. If more than one detector is used, the detectors are oriented with respect to the cow-containing site so as to acquire images of substantially the same region of interest but with. different angles of light collection, respectively. The output of the camera(s) is connectable to the control unit 110. The control unit is typically a computer system (preferably preprogrammed to be the so-called "expert system") having a memory utility 110A for storing inter alia predetermined reference data, a data processing and analyzing utility 110B, as well as an input interface 110C, data output utility 110D (display), etc.

For the purposes of the present invention, in this specific example of monitoring the BCS of a dairy cow, the region of interest to be imaged includes the dorsal part of the cow and/or the rear part of a dairy cow in the vicinity of the cow's tail head 114. Hence, the illuminating assembly 104 is oriented with respect to the cow-containing site so as to be placed behind and above the respective body part.

Preferably, an additional region of interest to be imaged, for the purposes described further below, is a waist part of the cow 114A including the transverse processes of the lumbar vertebrae and the spinous processes of the lumbar vertebrae.

Figure 2A:
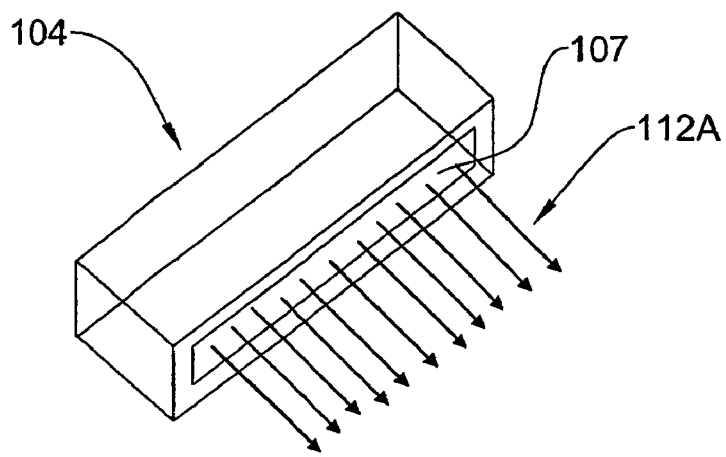
FIGS. 2A to 2C illustrate three different examples, respectively, of an illuminating assembly suitable to be used in the system of FIG. 1.
Figure 2B:
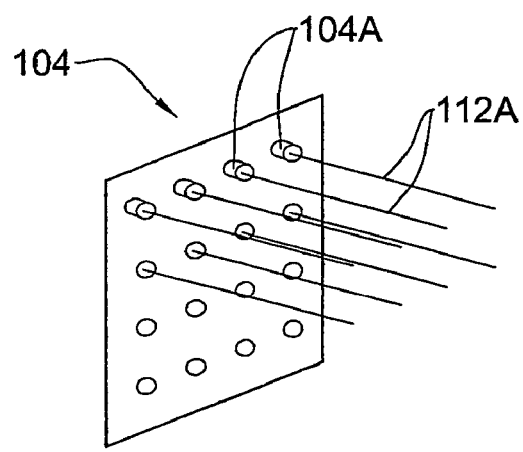
Figure 2C:
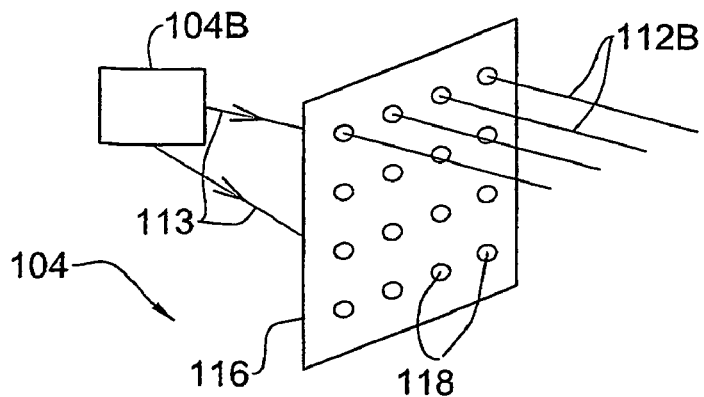

FIGS. 2A-2C illustrate three non-limiting examples of the implementation of the illuminating assembly 104. In the example of FIG. 2A, the illuminating assembly 104 includes one-dimensional array of light-emitting elements, (e.g. lasers that are operable to produce an array of spatially separated light beams, generally at 112A to thereby illuminate an array of spaced-apart locations (e.g., spots) within a region of interest. The illuminating assembly is the so-called "laser beam box", for example producing 40 laser beams with the beam axes being for example spaced a 2 cm distance from each other. The box 104 at its front surface (by which it faces the cow) is formed with an optical window 107 (e.g., glass window). A power supply of 4.5V and 500 mA is can be used. In the example of FIG. 2B, the illuminating assembly 104 is composed of a two-dimensional array of light-emitting elements, e.g. lasers, generally at 104A, each operable to produce a light beam 112A, to thereby illuminate a matrix (two-dimensional array) of spaced-apart locations (e.g., spots) within a region of interest.

In the example of FIG. 2C, the illuminating assembly 104 comprises a single light emitting element 104B generating a beam of light 113, and a mask (grid) 116 in the form of an array (one-dimensional array, or two-dimensional array as shown in the present example) of transmitting regions (e.g., holes) 118 spaced by non-transparent (blocking) regions. Hence, the mask (grid) 116 splits the emitted light beam 113 into a two-dimensional array of spatially separated light components 112B to thereby produce a two-dimensional array of spaced-apart illuminated locations within the region of interest. Generally speaking, the light components produced either by the array of light-emitting elements 104A or by the array of holes 118, are arranged in a pre-defined pattern, e.g., a matrix shape, e.g., consisting of straight lines and rows.

Figure 3A:
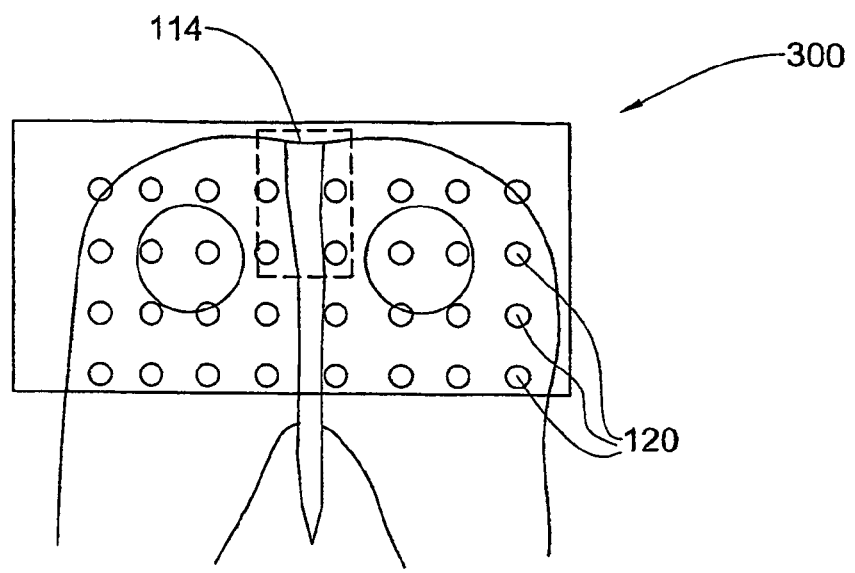
FIG. 3A schematically illustrates the region of interest on the body part of the dairy cow illuminated by the illuminating assembly of either one of FIGS. 2B and 2C.
Figure 3B:
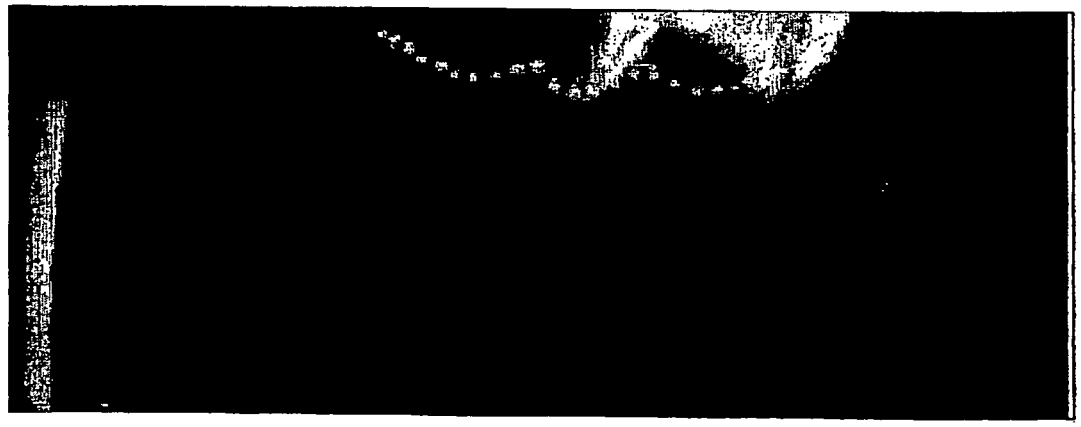
FIG. 3B illustrates the experiment of imaging the region of interest with the illuminating assembly of FIG. 2A.

FIG. 3A schematically illustrates the rear part of the cow (one example of the suitable region of interest) with a matrix of illuminated locations (spots) 120 covering the entire imaged area. FIG. 3B illustrates the experiment of imaging the region of interest with one-dimensional array of light beams: shift of the illuminated spots' locations from those obtainable on a flat surface is associated with the curvature of the imaged surface.

The main relevant parts for the scoring of the cow are the pins bone (Tuber ischii), the hooks bone (Tuber coaxe), the thurl and the sacral ligament. The central area of the illuminated body part along the tail head is typically convex, while the regions at both sides of the tail head may be convex, flat, or concave. The degree of concavity of these regions is correlated with the body condition of a cow. According to the conventional technique, a skilled person (veterinary) inspects the rear part of the cow visually, and sometimes with manually appreciation, to estimate the degree of concavity and/or convexity of the relevant areas and determine the BCS of the cow, that defines the sub cutaneus amount of adiposic tissue which indicates the energy balance of the cow.

In order to enable automatic determination of the BCS of dairy cows, the present invention uses the imaging system of FIG. 1 (with one or two cameras) and a specific image processing technique. As indicated above, the detection assembly preferably includes a video camera, operable to acquire 25 frames per second. The camera may be conventional industrial color video camera (e.g., 5×5×10 cm) equipped with appropriate focusing optics, aperture, shutter and speed and white balance means.

Initially, the required orientation between the system elements (the illuminator and the detector(s)) and the cow location or the cow movement path is provided. In general, images of the dorsal and/or the rear part of the cow are taken from up and behind the cow, at predetermined elevation angle(s), for example ranging between 450 and 900. If the camera is mounted at an angle other than the desired angle, the image is first transformed to meet this requirement, for uniformity purpose. This transformation may for example be a rotational transformation or a multiplication of rotational transformations that rotate the plane of image in the desired direction. For example, a suitable matrix (realizing the rotational transformation) multiplies the vector of points representing the spots of the image, to give the resulted vector, which represents the rotated plane, i.e., the rotated image.

Considering a single vide camera, it is preferably positioned at a 90 degree elevation and at a 145 cm distance from the cow back height to achieve a focused image (the laser line being in the middle of the image frame). The camera is calibrated once during the installation. The focus is set to an average distance of the cow back. The exposure is set to maintain a contrast between the laser spots and the brightest possible area on the dark area. The camera calibration stage includes the following two steps: acquiring a set of images at predetermined distances, and storing the images (in the memory utility of the control unit); processing the images to detect the laser spots; calibrating the processing (software model). to create a depth of focus to thereby give the desired precision of measurements of the surface profile depth (with about 1 mm tolerance). The determined depth of the spots' locations is then translated to a three-dimensional curve.

Figure 4:
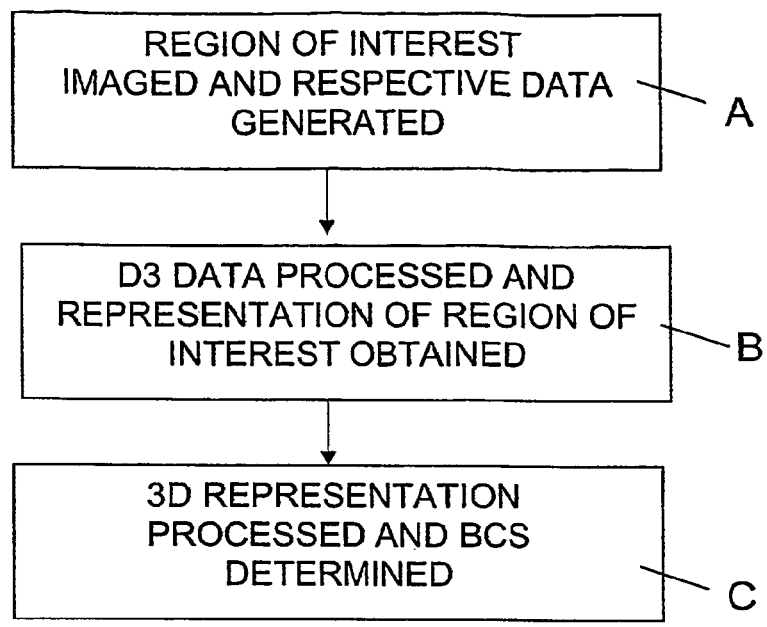
FIG. 4 is a flow diagram of the main operational steps in a method according to the invention.

As shown in FIG. 4, the main operational steps of the system are as follows. The optical device (illuminating assembly 104 and detection assembly 105 shown in FIG. 1) is operated to obtain data indicative of one or more images of the region of interest (step A). This is implemented by illuminating an array (one- or two-dimensional array) of locations within the region of interest on the cow's body, collecting light returned (scattered) from the region of interest by one or two cameras, and generating output indicative of the so-acquired images. This output data is received at the control unit 110 and processed by the data processing and analyzing utility (software) appropriately preprogrammed (e.g., with real time grabbing software with an event indicator whenever a new frame is grabbed) to control the imaging process and obtain three-dimensional representation of the body surface within the region of interest (step B), and further process the 3D representation to determine the BCS of the imaged cow (step C). This is implemented by calculating a value of a predetermined measurable parameter indicative of the curvature (surface relief) of the region of interest and utilizing previously prepared (and stored in the memory of the control unit) reference data in the form of BCS scales and corresponding values of the predetermined measurable parameter to analyze the calculated value and determine the corresponding BCS scale.

Generally speaking, in order to calculate the measurable parameter indicative of the curvature of the region of interest, a shift between the two images for each of the illuminated locations (spots) on the surface of the cow's body caused by the curvature of the surface is determined. If a single image is acquired, such a shift is a distance between the actual position of the illuminated location with respect to the other locations and a "theoretical" position of the corresponding location on the surface if being substantially flat (i.e., the corresponding location on the body surface along the trajectory of the corresponding light component). If two images are acquired by two detectors, respectively (or by the same detector but at different relative locations with respect to the region of interest, e.g., during the cow's movement with respect to the detector), this shift is determined as a distance between the two illuminated locations of a matching pair in the two images. The shift is indicative of the height of the respective point in the topography map (three-dimensional representation of the region of interest), which is determined by utilizing data indicative of the detectors' location with respect to each other and relative to the region of interest, or the single detector location relative to the region of interest and to the illuminator trajectory.

The measurable parameter is indicative of the curvature of the region of interest, i.e., of a topographic map (surface relief) of the region of interest, and is actually representative of the volume (depth) of the region of interest. This curvature is determined with respect to a predefined reference plane (RP in FIG. 1), which in the present example is perpendicular to the line between the camera and the cow's rear part and is tangential to the region of interest, namely, to the dorsal and/or the rear part of the cow at the point of spin bone and tail head. Generally, the reference plane is selected as a plane in the vicinity of the tail head.

Preferably, the system of the present invention is installed at a predetermined location for monitoring the dairy cow condition when passing along a predetermined (substantially straight) path. As indicated above, the cow is assigned with unique identification code that is presented on a tag attached to the cow. Such an ID tag may be optical (barcode), RF tag (carrying an RF resonance circuit), magnetic tag or of any other automatic ID technique. The construction and operation of the tag do not form part of the invention. Such a tag may be of any known suitable type, and therefore need not be specifically described, except to note that it is preferably attached to a predetermined location on the cow, for example the front leg of the cow. When the cow moves along the predetermined path and its front leg arrives at a location of the ID reader accommodation, the cow is identified and a respective signal is generated (by the ID reader) to activate the imaging system either immediately or a certain time thereafter, depending on a distance between the ID-location and the region of interest and a prediction of the cow movement speed. It should be understood that alternatively or additionally, the imaging system or at least its optics is movable with respect to the cow location. It should also be understood that that the system of the present invention may utilize a remote control unit that may be wireless connected to the optical device. The system may operate to grab the required number of images and transmit data indicative of the images as well as data indicative of the cow's ID to a remote (central) location where the data is appropriately processed.

Preferably, a sequence of images of the moving cow is acquired so as to thereby identify an in-coordination or locomotion problem of the cow marching. The existence of a certain pattern of this locomotion and/or in-coordination problem is indicative of a certain problem (disease), for example is indicative of limping, neurological disorder associated with nervous system diseases, such as "mad cow" disease, CCN (Cerebrocortical necrosis), tumors, parasitoses, meningitis, rabies, trauma, compression and intoxicoses of the animal.

As indicated above, another region of interest for monitoring the BCS of dairy cow is the part of the cow. It has been found that a difference between the BCS values measured at the transverse processes of the lumbar vertebrae and the spinous processes of the lumbar vertebrae and tail-parts of the cow is indicative of the tendency in the cow energy balance condition thereof. For example, the BCS values of 3.2 and 3.1 measured at, respectively, the transverse processes of the lumbar vertebrae and the spinous processes of the lumbar vertebrae, and the tail-part of the cow are indicative of that the cow is in accumulating surplus of the energy balance, and vice versa, if the BCS values of 3.1 and 3.2 are measured at, respectively, the transverse processes of the lumbar vertebrae and the spinous processes of the lumbar vertebrae the and tail-part of the cow, this is indicative of that the cow is in accumulating deficit of the energy balance.

Figure 5A:
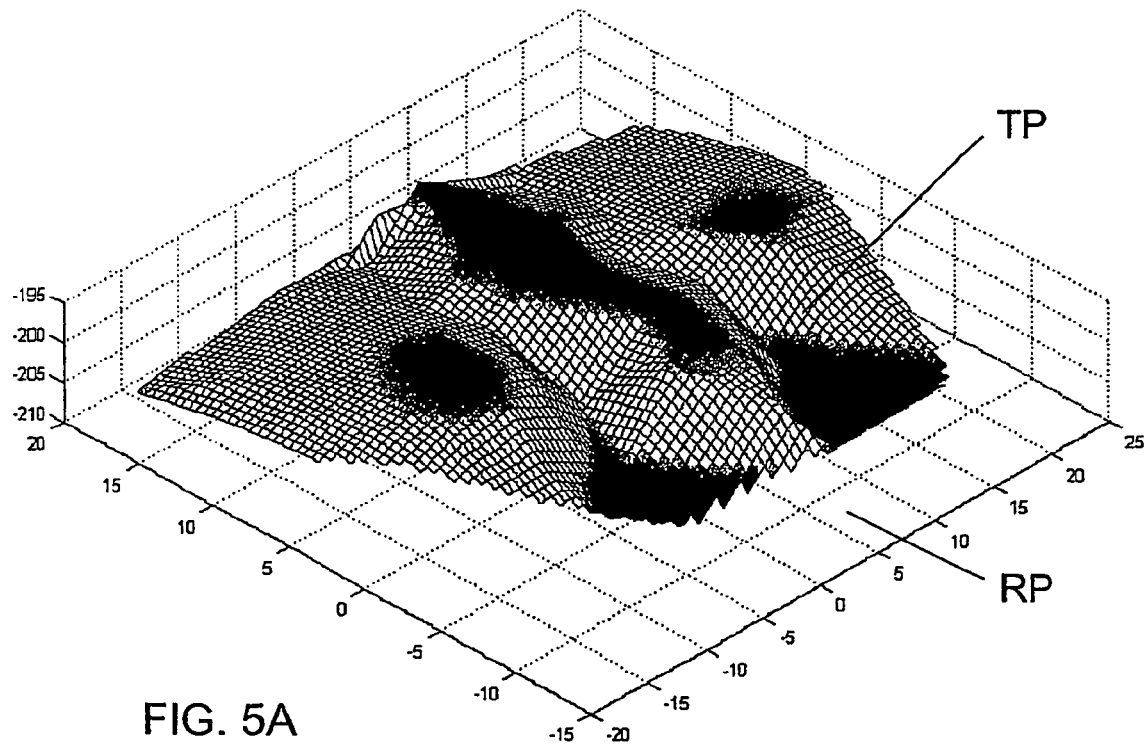

FIGS. 5A-5C exemplify the determination of the measurable parameter according to the technique of the present invention.

FIG. 5A shows a 3D topography map TP reconstructed from the map(s) of points grabbed by one or two cameras from the region of interest (back of the cow). These points correspond to the scattering of the illuminated locations produced by the structured incident light. For example, a matrix of 120 laser sources can be used as the illuminating assembly. As shown in FIG. 5B, the measurable parameter may be a distance h (height) between the reference plane RP and the point $P_1$ in the topography map mostly distant from the reference plane, or a cross-sectional area CA of a cross-sectioned segment ES of the map in a plane P perpendicular to the reference plane and defined by a pair of most distant points $P_1$ and $P_2$ at opposite sides of the central plane of the image. Such a measurable parameter may be a volume V (depth) of at least a part of the topography map shown in FIG. 5A. The topography map is composed of a plurality of height levels defining contours of constant height levels ($C_1$-$C_5$) in the 2D representation of the 3D-topography map, shown in FIG. 5C. An arrow B represents the tail head, which is typically an axis of symmetry of the image of the structured light. Points A and C are the end points in the 2D image along an envelope segment passing through the two points $P_1$ and $P_2$, which were defined above. Thus, there are several techniques for calculating the measurable parameter indicative of the curvature (the so-called Curvature Factor Measure or CFM). According to one technique, this parameter is the distance between the reference plane RP and the point on the line-segment ES maximally distant from the reference plane RP.

According to another technique, this parameter is the cross-sectional area CA confined between the envelope segment ES and its projection on the reference plane AC. Preferably, the measurable parameter is the volume of at least a part of the topography map confined between the envelope segment, wherein the relevant part of the topography map is defined by a rectangle of a certain area (the entire structured light grid LG or a part of it) around the line segment ES, and the projection of this area onto the reference plane. This calculation practically comprises the integration of the height values of the illuminated locations (centers of these locations) over the image within the certain area, or, equivalently, summing the distances between the envelope segment and the reference plane over all the center points of the illuminated locations within the certain area. This can be written as:

$$CFM = \sum_{i,j} (P(i, j) - \text{Re}f(i, j)) \times AreaUnit$$

wherein $P(i, j) - \text{Ref}(i, j)$ is the height difference value between the envelope segment and the reference plane at point $(i, j)$, and AreaUnit is the mean area around one illuminated location (spot) in the structured light matrix, or more precisely, the square of the mean distance between the centers of the neighboring illuminated spots in the structured light matrix. Hence, the CFM value may be given in volume units, e.g. cubic centimeters ($cm^3$).

The accuracy in calculating the centers of the illuminated locations is estimated to be about a tenth of a pixel. The accuracy in height is estimated to be about $\frac{1}{2000}$ of the field-of-view of the camera, which for a measured volume of 600 mm*600 mm*600 mm is about 0.5 mm, less than the expected error due to the fur of a cow. The maximal expected depth of concavity is about 150 mm. If the BCS value should be calculated with accuracy of 0.25, there are 16 different values between BCS 1 and 5. Thus, accuracy in height of 150 mm/16 or 9.375 mm is sufficient for the purposes of the present invention. The estimated accuracy is 5 times better. The system today deals with the following 13 BCS scale values: 1.00, 1.50, 2.00, 2.25, 2.50, 2.75, 3.00, 3.25, 3.50, 3.75, 4.00, 4.50, and 5.00. With the accuracy of 1 decimal score (0.1), 50 BCS scales can be achieved (1.00, 1.10, 1.20, ... 4.80, 4.90, 5.00).

FIG. 5D schematically illustrates the spots' pattern on the rear part of a cow.

It should be understood that, actually, imaging and analyzing the surface relief at one side of the cow's tail is sufficient for the purposes of the present invention.

The rear part of a cow may comprise deep valleys (for thin cows of low BCS) or shallow valleys, or may have no valleys at all (for normal cows with moderate BCS). Accordingly, the CFM can be positive, zero or negative. The inventors have found that for cows with BCS of about 3.50, the value of CFM is about zero. Thus, for cows of the BCS below 3.50 the value of CFM is negative, while cows of BCS above 3.50 have a positive value of CFM.

Using reference data in the form of a large set of scans of cows of known BCS values enables to calculate the CFM values resulting from the image processing for each scan and match it with the given BCS value. Hence, a correlation between CFM and BCS values can be determined. This correlation is not necessarily a linear transformation and might not even be represented by any mathematical formula at all, but is simply experimentally matched. In such a case, the match is represented in a table correlating between pairs of points, where the first point is a CFM value, and the other point is a BCS value.

Figure 6:
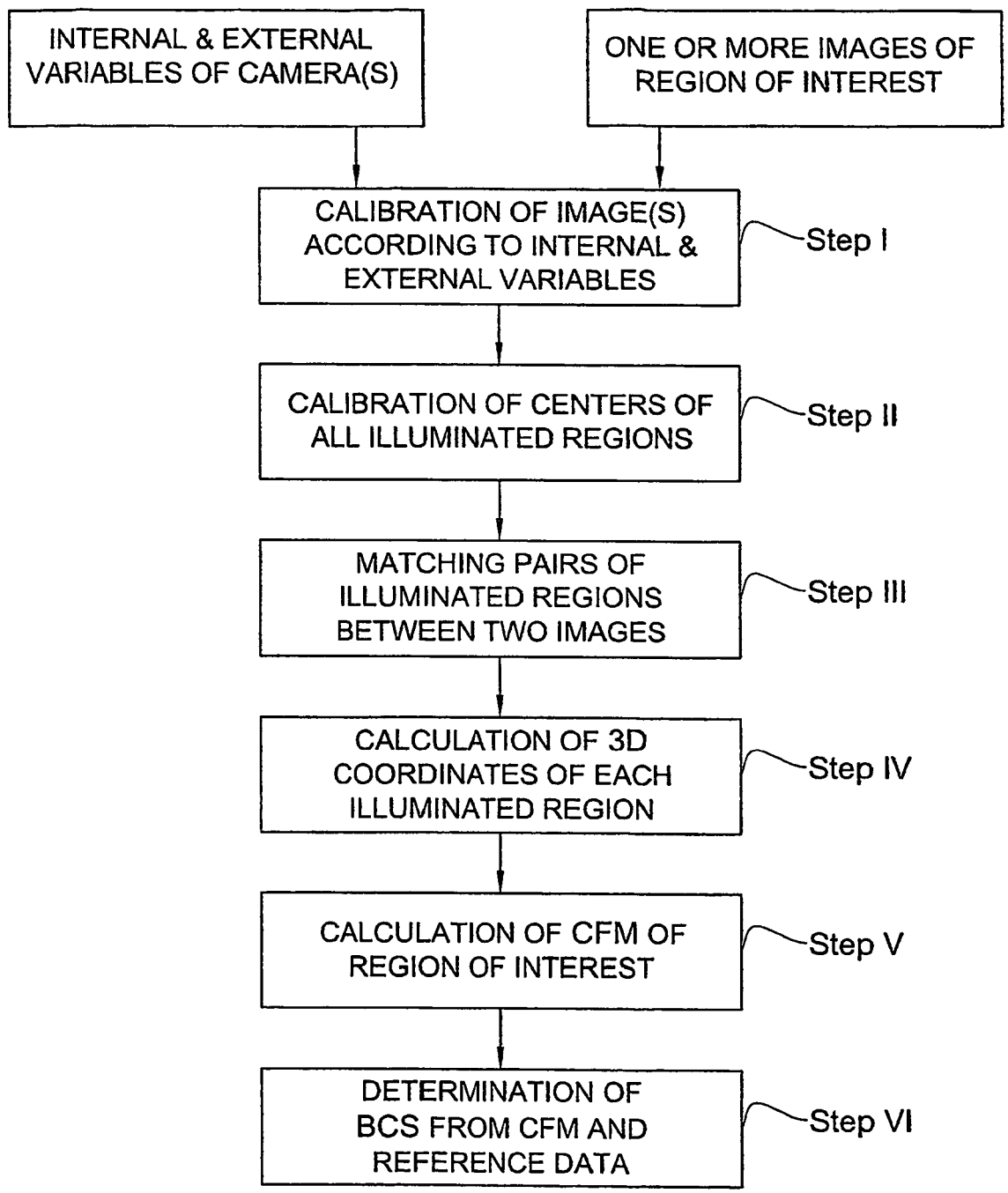
FIG. 6 is a flow diagram of the image processing steps according to one embodiment of the invention utilizing acquisition of two images with different light collection angles.

Reference is now made to FIG. 6 exemplifying a flow diagram of the operational stages of the image processing considering the image acquisition with two cameras, or a single video camera. In this case, the data to be processed is indicative of two images of the cow's rear part concurrently acquired by two cameras with two different angles of light collection.

Initially, a calibration stage is carried out, in order to compensate for internal variables of the camera(s) and for external variables of the camera(s) (step I). Such internal variables include magnification, calibration and Distortion, while external variables of the cameras are for example the relative angles of the cameras in space.

Then, calibration of the centers of all illuminated locations is carried out by suitable image processing (e.g., including pattern recognition)—step II. The spot's center can be identified as the brightest point or gravity center in the spot. When operating with two cameras, processing of data received from the two cameras includes finding the matching pairs of illuminated locations, i.e., two images of the same illuminated location. Since such an illuminated location is practically not a point-like location, but a spot, elongated region, line, etc., the processing starts with finding the center of each of the illuminated locations in each of the two images. For light spots, the center is simply the geometrical center of each spot. The finding of the center can be done by any known suitable method, for example by detecting extreme locations of the illuminated region along two mutually perpendicular axes and calculating the center of the so-formed geometrical structure. For lines, the central point is defined as the point of maximal light intensity along the illuminated line. Then (considering the operation with two cameras), matching pairs between the central points of the illuminated locations in the two images are determined, i.e., location of each illuminated spot in the first image is matched with the corresponding location in the second image (step III). In general, imaging of a flat surface, e.g. a flat wall, using a matrix of illuminated spots would result in an image composed of a matrix of spots with the same pattern as that of the matrix of incident light components, e.g., a two-dimensional linear array. When illuminating the dorsal and/or the rear part of a cow, which is a curved surface, the locations of some of the spots are shifted from those in the flat-surface image, due to the surface curvature. Moreover, some of these spots, e.g. at places of extreme curvature, where one spot may coincide with another spot, may not appear in the image at all. Hence, there can be unmatched spots in the two images, but it should be understood that the matched spot in one image is always associated with a single spot in the other image. It should be understood that when operating with the single video camera, this step III is eliminated. 5 At a further step (step IV), 3D coordinates of each illuminated location on the cow's surface are calculated, utilizing the data representative of the spots' centers location (or, in the case of two cameras, data representative of the two-dimensional coordinates of the pairs of central points of the matched illuminated locations) and data representative of the three-dimensional (3D) location of the camera(s). This can be done by the triangulation method. The principles of this technique are know per se, and therefore need not be described in detail, except to note the following. The triangulation technique is based on measuring a shift (called parallax) of an imaged object in two images. More specifically, when the object is imaged by two cameras distanced from each other (or by one camera taking two different shots at two places far apart), the relative place of the object is shifted between the two images, i.e., the object's image changes its location relative to the background. Measuring this shift allows for determining the distance of the object from the background or from the camera(s), or finds its location in space. By this, the 3D locations of all the illuminated spots within the region of interest are calculated, assuming that the peripheral illuminated spots may serve as the background for the calculation in the first approximation. If the peripheral illuminated spots are not shifted due to the surface curvature, or if such a shift is negligible, the use of a single camera is sufficient to calculate the deviation of each of the interior illuminated spots from its assumed position in the absence of the surface curvature. This shift, together with the relative locations of the camera and the light source from the region of interest, enable to calculate the "height" of each illuminated spot with respect to an imaging plane. When the single video camera is used, each point depth is calculated by measuring the distance between this point and a straight reference line between the tow pins bone tuber ischii), as shown in FIG. 5D. To this end, one-side measuring is sufficient, or when having data from both sides, the highest side is taking into account.

The so-obtained 3D coordinates are then used to calculate Curvature Factor Measure (CFM) indicative of the cow's body condition score—step V To this end, a two-dimensional (2D) representation of the 3D cow's rear part is obtained, for example in the following manner. First, the reference plane RP is selected. Then, the points calculated in the previous stage are drawn on the selected reference plane. In order to do so, their coordinates may need to be transformed according to the coordinate system of the chosen plane. The first two coordinates of each point $(X_i, Y_i)$ represent its place within the reference plane RP, while the third coordinate $(Z_i)$ denotes the height of the point above/beneath the reference plane RP. This data indicative of the points' heights is used to calculate the CFM. The 3D virtual surface is thus the basic for the CFM measurements. The BCS is then obtained from the calculated CFM value and the reference data, as described above (step VI).

It should be understood, that in the case of a single camera, the image processing is generally similar to that of two cameras, and differs therefrom in the following two modifications. (a) Finding of matching pairs of points (centers of the illuminated spots) is eliminated since there is a single image; and (b) Calculation of the 3D location of a given illuminated spot on the cow's body part is carried out by taking into account the location of the light source and the direction of the light beam from the light source to the relevant light spot along the trajectory of the beam. These modifications actually affect the determination of the shift to calculate the 3D location of each illuminated spot, i.e. to reconstruct the topographic map. As indicated above, the shift between the actual location of the illuminated spot and a "theoretical" location of the corresponding area on the surface if being substantially flat is determined in order to calculate the CFM.

The system of the present invention has been tested on more than 500 dairy cows during three days. The tests were fully automated with no interference with the regular work in the cow house. The results obtained with the system of the present invention were very close to those obtained manually by the expert (veterinary), and a very high repeatability of the system operation was observed.

Those skilled in the art will readily appreciate that various modifications and changes can be applied to the embodiments of the invention as hereinbefore exemplified without departing from its scope defined in and by the appended claims.

The invention claimed is:

1. A method for optimizing nutrition of an animal, the method comprising automatically monitoring the energy balance of the animal, said monitoring comprising:
   1) imaging by an imaging sensor a predetermined region of interest on the animal body, and generating data indicative thereof, said region of interest including at least one of the following body parts: a rear part of a cow in the vicinity of its tail head; and at least one of the dorsal parts of the cow;
   ii) processing the generated data to obtain a three-dimensional representation of the region of interest;
   iii) analyzing said three-dimensional representation to determine a predetermined measurable parameter indicative of a surface relief of the region of interest indicative of the energy condition of the animal; and
   iv) determining a body condition score (BCS) of the cow.

2. The method according to claim 1, wherein said imaging comprises illuminating the region of interest by structured light in the form of an array of spaced-apart light components to thereby illuminate an array of spaced-apart locations within the region of interest, and collecting light returned from the illuminated locations.

3. The method according to claim 1, wherein said processing of the three-dimensional representation utilizes reference data representative of the body condition scales and corresponding values of said predetermined measurable parameter indicative of the curvature of the region of interest.

4. The method according to claim 3, wherein said predetermined measurable parameter indicative of the curvature of the region of interest is representative of a depth of the region of interest.

5. The method according to claim 1, wherein said specific measurable parameter is indicative of the curvature of the surface of the region of interest with respect to a predefined reference plane.

6. The method according to claim 1, wherein said specific measurable parameter is indicative of the curvature of the surface of the region of interest with respect to a predefined reference plane, tangential to the dorsal or the rear part of the cow at the point of pin bone and tail.

7. The method according to claim 5, wherein said specific measurable parameter is representative of at least one of the following: a distance between the reference plane and a point in the region of interest mostly distant from said reference plane; a surface area defined by the illuminated surface locations in a plane perpendicular to said reference plane and including the mostly distant point; and at least a part of a volume defined by the illuminated surface locations and said reference plane.

8. The method according to claim 2, wherein said array of incident light components is produced by carrying out one of the following:
   (i) passing a light beam generated by a light emitting element through a mask accommodated in the path of the emitted light beam, thereby splitting the emitted light beam into the array of the spatially separated light components;
   (ii) providing an array of light emitting elements generating said array of incident light components, respectively.

9. The method according to claim 1, wherein the processing of said generated data comprises carrying out one of the following:

(a) determining a relative shift of the illuminated locations from a relative location of the corresponding light component in the array of light components, said shift being caused by the curvature of the illuminated surface and being indicative of said curvature;

(b) determining central points of all illuminated locations in the image of the region of interest.

10. The method according to claim 5, wherein the processing of said generated data comprises determining a relative shift of the illuminated locations from a relative location of the corresponding light component in the array of light components, said shift being caused by the curvature of the illuminated surface and being indicative of said curvature, said shift being representative of a distance between the respective illuminated location and said reference plane.

11. The method according to claim 9, wherein (a) is carried out, and said imaging of the region of interest comprises carrying out one of the following:

(i) acquiring an image of the region of interest, said shift being a distance between the illuminated location on the curved surface of the body part and a corresponding location along the trajectory of the corresponding light component; and (ii) acquiring at least two images of the region of interest with different angles of collection of light returned from the region of interest, said shift being a distance between two illuminated locations of a matching pair of locations in the two images.

12. The method according to claim 1, wherein the imaging comprises acquiring a sequence of images of the region of interest by a single camera at different relative positions between the camera and the region of interest.

13. The method according to claim 12, wherein said camera is a video camera.

14. The method according to claim 1, wherein said imaging is carried out during a movement of the animal along a predetermined path.

15. The method according to claim 9, wherein (b) is carried out, and the data representative of the acquired images is indicative of the existence of at least one of the following conditions: an in-coordination in the natural movement of the cow, and changes in the natural movement of the cow.

16. The method according to claim 1, comprising imaging an additional region of interest in the vicinity of the transverse processes of the lumbar vertebrae and the spinous processes of the lumbar vertebrae of the cow, and determining the BCS with respect to this additional region of interest, thereby enabling determination of a tendency of the energy balance change for the imaged cow.

17. The method of claim 16, comprising determining a difference between the two determined BCS values, said difference being indicative of a tendency in the cow energy balance condition.

18. A system for monitoring the body condition of an animal, the system comprising:

(a) an optical device including an illuminating assembly operable to produce structured light in the form of an array of spatially separated light components to thereby illuminate an array of locations within a predetermined region of interest on a body part of the animal, and a light detection assembly operable for acquiring at least one image of the illuminated body part by collecting light scattered therefrom and generating data indicative of the acquired image;

(b) a control unit connectable to the optical device, the control unit comprising a memory utility for storing reference data representative of the body condition scales and corresponding values of a predetermined measurable parameter that is indicative of the curvature of the predetermined region of interest; and a data processing and analyzing utility preprogrammed for processing the data indicative of the acquired image to calculate a value of the measurable parameter for the specific imaged animal, and analyze the calculated value with respect to the reference data to thereby determine the body condition scale of the specific animal, the system being configured for monitoring a body condition score (BCS) of dairy cows, said region of interest including at least one of the following part of the cow's body: at least one of the dorsal parts, and the rear part of the cow in the vicinity of its tail head.

19. The system according to claim 18, wherein the illuminating assembly has one of the following configurations:

(i) comprises a light emitting element operable to emit a light beam, and a mask accommodated in the path of the emitted light beam to split it into the array of spatially separated light components;

(ii) comprises an array of light emitting elements operable to emit the array of light components, respectively.

20. The system according to claim 18, wherein the detection assembly has one of the following configurations:

(i) comprises a single pixel-array detector;

(ii) comprises two pixel-array detectors.

21. The system according to claim 20, wherein (i) is carried out, and said detector is a video camera, the control unit comprising a frame grabbing utility.

22. The system according to claim 20, wherein (ii) is carried out, and said two pixel-array detectors are oriented with respect to the region of interest so as to acquire two images with different collection angles, respectively.

23. The system according to claim 18, wherein said data processing and analyzing utility is operable to carry out one of the following:

(i) determine a shift of each of the illuminated locations within the array of the illuminated locations caused by the curvature of the illuminated surface, said shift being indicative of said curvature;

(ii) determine central points of all the illuminated locations; and (iii) analyze the data indicative of the images acquired during natural marching of a dairy cow to determine existence of a certain locomotion pattern or in-coordination in the cow's marching.

24. The system according to claim 18, wherein said shift is determined as one of the following:

(i) a distance between the illuminated location on the curved surface of the body part and a corresponding location along the trajectory of the corresponding light component;

(ii) a distance between the two illuminated locations of a matching pair of locations in the two images.

25. The system according to claim 18, wherein said predetermined measurable parameter indicative of the curvature of the region of interest is representative of a depth of the region of interest.

26. The system according to claim 18, wherein said predetermined measurable parameter is indicative of the curvature of the surface of the region of interest with respect to a predefined reference plane.

27. The system according to claim 18, wherein said predetermined measurable parameter is indicative of the curvature of the surface of the region of interest with respect to a predefined reference plane tangential to the rear part of the cow at the point of spin bone and tail.

28. The system according to claim 26, wherein said predetermined measurable parameter is representative of at least one of the following: a distance between said reference plane and a point on the region of interest mostly distant from said reference plane; a surface area defined by the illuminated surface locations in a plane perpendicular to said reference plane and including the mostly distant point; and at least a part of a volume defined by the illuminated surface regions and said reference plane.

29. The system according to claim 26, wherein said shift is representative of a distance between the respective illuminated location and said reference plane.

* * * * *